United States Patent
Yamamoto

(10) Patent No.: US 9,724,984 B2
(45) Date of Patent: Aug. 8, 2017

(54) DOOR FOR UTILITY VEHICLE AND UTILITY VEHICLE EMPLOYING SAME DOOR

(71) Applicant: KAWASAKI JUKOGYO KABUSHIKI KAISHA, Hyogo (JP)

(72) Inventor: Teruaki Yamamoto, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 53 days.

(21) Appl. No.: 14/665,516

(22) Filed: Mar. 23, 2015

(65) Prior Publication Data

US 2016/0280049 A1    Sep. 29, 2016

(51) Int. Cl.
*B60J 5/04*    (2006.01)

(52) U.S. Cl.
CPC ........... *B60J 5/0463* (2013.01); *B60J 5/0487* (2013.01)

(58) Field of Classification Search
CPC .............................. B60J 5/0463; B60J 5/0487
See application file for complete search history.

(56) References Cited

U.S. PATENT DOCUMENTS

| 6,048,005 | A | * | 4/2000 | Rotondi | ................. | E05C 17/042 |
| | | | | | | 292/262 |
| 7,988,210 | B2 | * | 8/2011 | Shibata | ................. | B60J 5/0487 |
| | | | | | | 16/82 |

* cited by examiner

*Primary Examiner* — Glenn Dayoan
*Assistant Examiner* — Melissa A Black
(74) *Attorney, Agent, or Firm* — Wenderoth, Lind & Ponack, L.L.P.

(57) ABSTRACT

A door for utility vehicle including a door body part provided with a grip part used for opening and closing the door. The door body part is supported by a vehicle body frame in a manner of being capable of being set at a plurality of closed states each having a different gap between the door body part and the vehicle body frame.

2 Claims, 6 Drawing Sheets

DOOR FOR UTILITY VEHICLE AND UTILITY VEHICLE EMPLOYING SAME DOOR

BACKGROUND OF THE INVENTION

1. Field of the Invention

The present invention relates to a door for utility vehicle and a utility vehicle employing the same door.

2. Description of the Related Art

In the conventional art, a door for utility vehicle is formed in a plate shape and hence ventilation cannot be achieved through the door. Usually, the door separates, in the lower half part, the riding space from the outside of the side part of the vehicle body. Thus, when the door is closed, heat is easily accumulated in the inside of the vehicle, especially, in the lower part of the inside of the vehicle. Accordingly, adjustment of the temperature environment in the inside of the vehicle has been difficult.

SUMMARY OF THE INVENTION

Thus, an object of the present invention is to provide a door for utility vehicle that permits adjustment of the temperature environment in the inside of a vehicle.

In order to achieve the above-mentioned object, a first invention of the present application is a door for utility vehicle, wherein:

the door includes a door body part provided with a grip part used for opening and closing the door; and the door body part is supported by a vehicle body frame in a manner of being capable of being set at a plurality of closed states each having a different gap between the door body part and the vehicle body frame.

According to the above-mentioned configuration, the door body part can be set at a plurality of closed states each having a different gap relative to the vehicle body frame. This permits adjustment of the temperature environment in the inside of the vehicle; especially, in the lower part of the inside of the vehicle.

It is preferable that the first invention further includes the following configurations.

(1) When a fixing position of fixing the door body part to the vehicle body frame is changed, the door body part can be set at a completely closed state having no gap relative to the vehicle body frame or a half-closed state having a gap.

(2) The door body part includes a latch part, wherein:

the vehicle body frame is provided with an engagement part for engaging with the latch part; and the latch part can be fixed to the engagement part at two steps consisting of a completely closed state having no gap between the door body part and the vehicle body frame and a half-closed state having a gap.

According to the above-mentioned configuration (1), when the fixing position of fixing the door body part to the vehicle body frame is changed, the presence or absence of a gap between the door body part and the vehicle body frame can be selected. Thus, the situation can be changed to a state in which a gap is provided between the door body part and the vehicle body frame so that ventilation is performed or a state in which the gap between the door body part and the vehicle body frame is closed and hence ventilation is not performed. By virtue of this, the temperature environment in the inside of the vehicle can be adjusted.

According to the above-mentioned configuration (2), the latch part of the door body part and the engagement part of the vehicle body frame realize the presence or absence of a gap between the door body part and the vehicle body frame. Thus, the situation can be changed to a state in which a gap is provided between the door body part and the vehicle body frame so that ventilation is performed or a state in which the gap between the door body part and the vehicle body frame is closed and hence ventilation is not performed. By virtue of this, the temperature environment in the inside of the vehicle can be adjusted.

Further, a second invention of the present application is a utility vehicle employing the door of the first invention.

According to the above-mentioned configurations, a utility vehicle can be provided that includes a door permitting adjustment of the temperature environment in the inside of the vehicle.

In summary, according to the present invention, a door for utility vehicle can be provided that permits adjustment of the temperature environment in the inside of a vehicle.

DETAILED DESCRIPTION OF THE INVENTION

Overall Configuration of Vehicle

Figure 1:
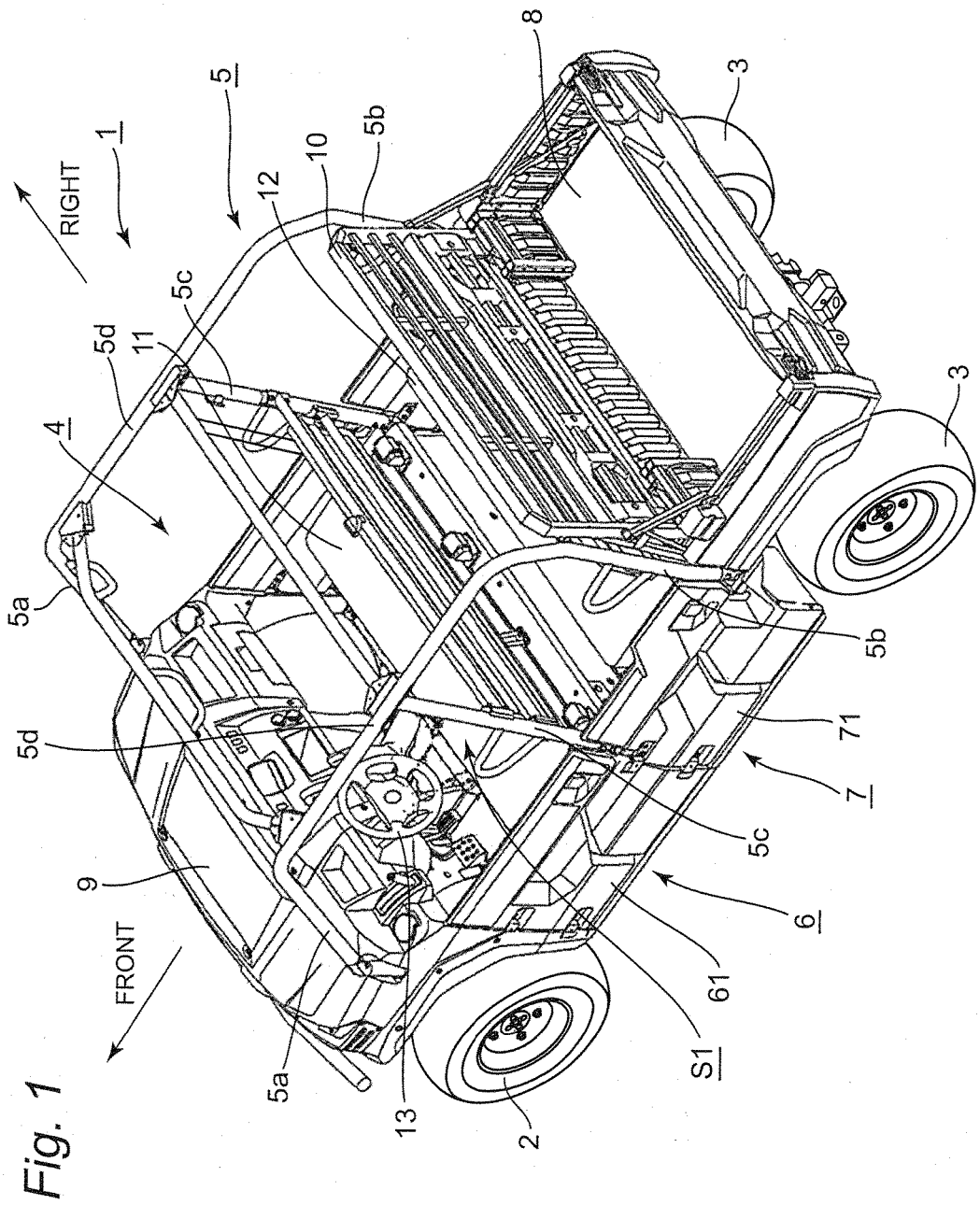
FIG. 1 is a perspective view of a utility vehicle employing a door according to an embodiment of the present invention.
Figure 2:
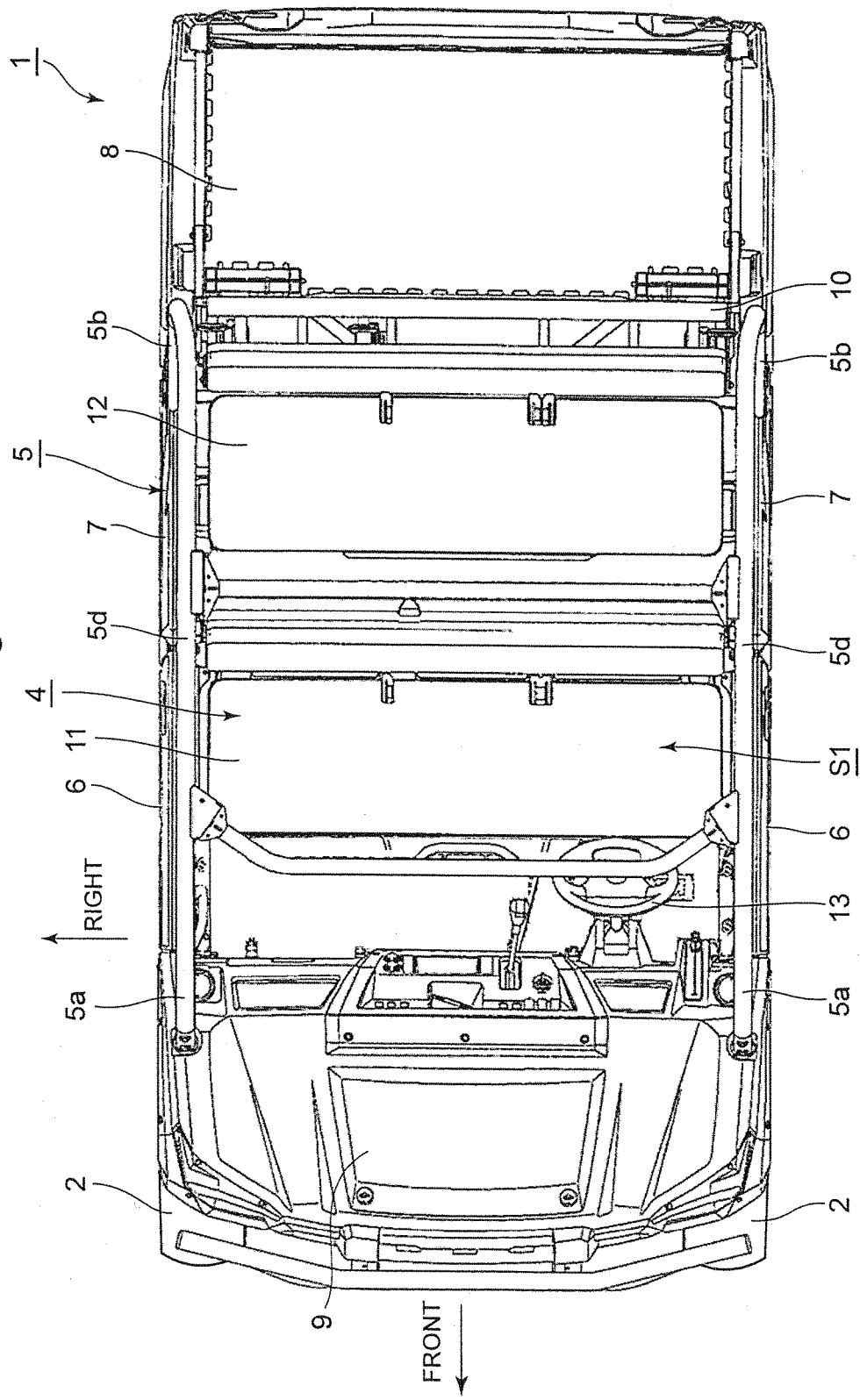
FIG. 2 is a top view of the utility vehicle of FIG. 1.

FIG. 1 is a perspective view of a utility vehicle employing a door according to an embodiment of the present invention. The utility vehicle is used mainly for running in off-road circumstances like a grass field, a gravel field, and a sand field as well as an unpaved mountain path, an unpaved path through woods, a mud path, and a rocky field. Here, in the following description, it is premised that the concept of direction employed in the present embodiment agrees with the concept of direction viewed from the driver of the utility vehicle. FIG. 2 is a top view of the utility vehicle of FIG. 1 and FIG. 3 is a left side view of the utility vehicle of FIG. 1.

Figure 3:
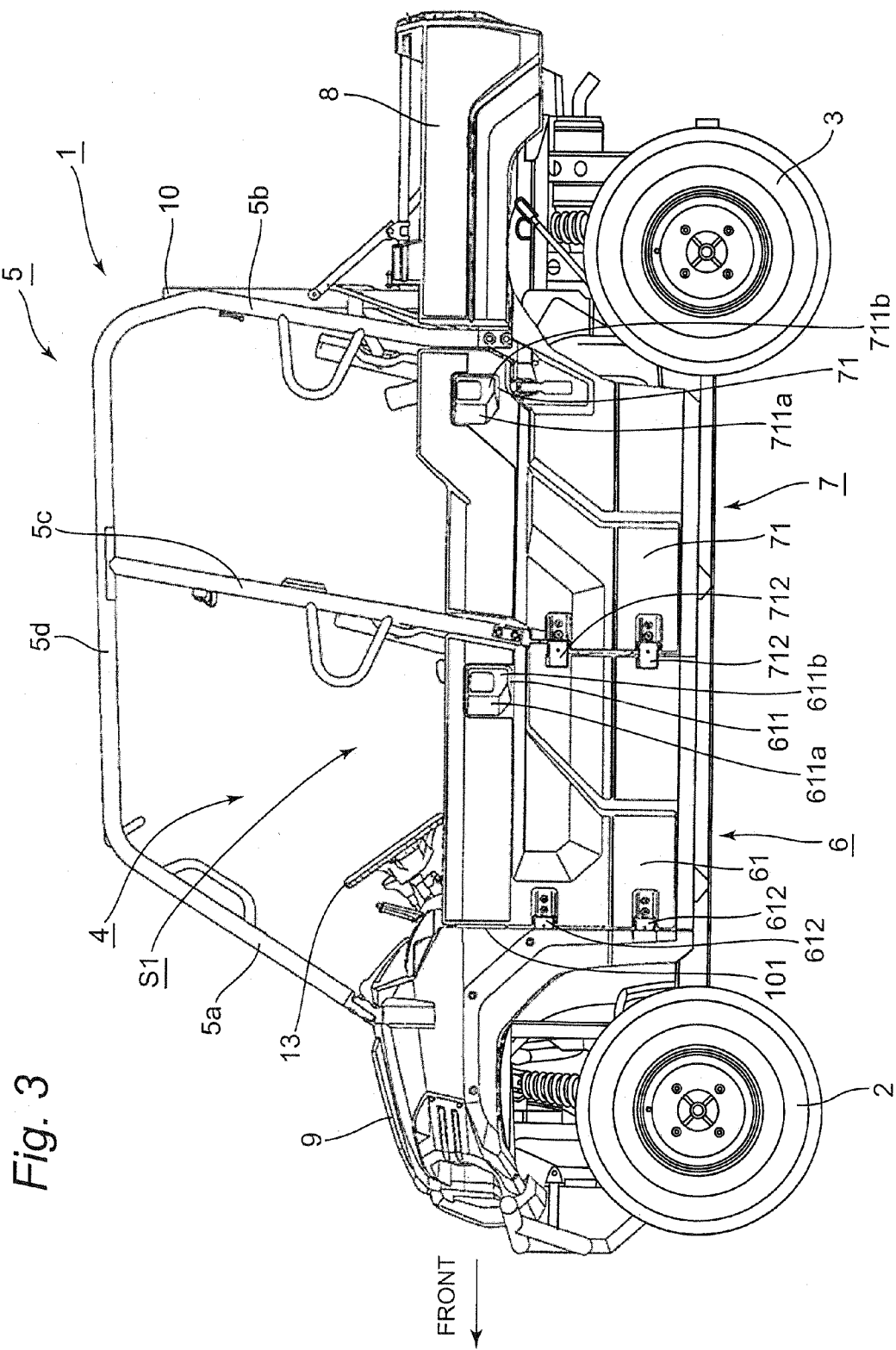
FIG. 3 is a left side view of the utility vehicle of FIG. 1.

As shown in FIGS. 1 to 3, the utility vehicle 1 includes: a pair of right and left front wheels 2 provided in a front part of the vehicle body; a pair of right and left rear wheels 3 provided in a rear part of the vehicle body; and a riding space (cabin) 4 between the front wheels 2 and the rear wheels 3. The riding space 4 is surrounded by a ROPS 5, a pair of right and left front doors 6, and a pair of right and left rear doors 7. The ROPS 5 is an abbreviation of rollover protective structure and constitutes apart of the vehicle body frame. The ROPS 5 includes: a pair of right and left front longitudinal members 5a; a pair of right and left rear longitudinal members 5b; a pair of right and left intermediate longitudinal members 5c arranged between the front longitudinal members 5a and the rear longitudinal members 5b; and a plurality of upper end beam members 5d for linking the upper end parts of the individual longitudinal members 5a, 5b, and 5c. Then, a cargo bed 8 is provided behind the riding space 4 and a bonnet 9 is provided in front of the riding space 4. Further, a screen 10 for partitioning from the riding space 4 is provided in the front end part of the cargo bed 8. A front seat 11 of bench type is provided in the front half part of the riding space 4 and a rear seat 12 of bench type is provided in the rear half part of the riding space 4. A seat region S1 on the left side of the front seat 11 is a driver seat and an operation part such as a steering wheel 13 is provided in front of the left part of the seat region S1.

[Configuration of Front Door]

The front door 6 includes a front door body part 61 provided with a grip part 611 used for opening and closing the front door 6. The front door body part 61 is formed in a plate shape and separates, in the lower half part, the riding space 4 front side from the outside of the side part of the vehicle body.

The front door body part 61 includes two hinges 612 aligned in the up and down directions in the front end part and is attached through the hinges 612 to a front frame 101 for supporting the bonnet 9. Then, the front door body part 61 can be opened right or left outward of the vehicle body about a rotation pivot formed by the hinges 612.

The grip part 611 is formed on the outer surface of the rear upper part of the front door body part 61. The grip part 611 includes: a grip part 611a gripped by a hand of the crew member; and a recess part 611b into which a part of the hand gripping the grip part 611a can be inserted. The crew member opens and closes the front door 6 while gripping the grip part 611.

[Configuration of Rear Door]

The rear door 7 includes a rear door body part 71 provided with a grip part 711 used for opening and closing the rear door 7. The rear door body part 71 is formed in a plate shape and separates, in the lower half part, the riding space 4 rear side from the outside of the side part of the vehicle body.

The rear door body part 71 includes two hinges 712 aligned in the up and down directions in the front end part and is attached through the hinges 712 to the intermediate longitudinal members 5c of the ROPS 5. Then, the rear door body part 71 can be opened right or left outward of the vehicle body about a rotation pivot formed by the hinges 712.

The grip part 711 is formed on the outer surface of the rear upper part of the rear door body part 71. The grip part 711 includes: a grip part 711a gripped by a hand of the crew member; and a recess part 711b into which a part of the hand gripping the grip part 711a can be inserted. The crew member opens and closes the rear door 7 while gripping the grip part 711.

[Supporting Structure for Door]

The front door body part 61 and/or the rear door body part 71 is supported by a vehicle body frame in a manner of being capable of being set at a plurality of closed states each having a different gap between the door body part and the vehicle body frame. The supporting structure can be applied to the front door body part 61 and the rear door body part 71. Then, the supporting structure may be applied to any one of the pair of right and left front door body parts 61 or, alternatively, may be applied to both. Similarly, the supporting structure may be applied to any one of the pair of right and left rear door body parts 71 or, alternatively, may be applied to both. Here, it is preferable that the supporting structure is applied at least to the front door body part 61 on the left side, that is, the door body part on the driver side. The following description is provided for an example in which the supporting structure is applied to the front door body part 61 on the left side.

Figure 4:
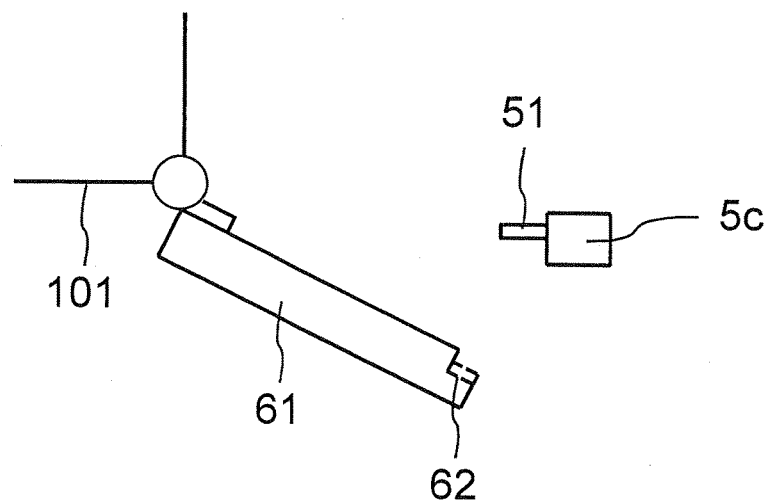
FIG. 4 is a top view showing a supporting structure for a front door body part on the left side.
Figure 5:
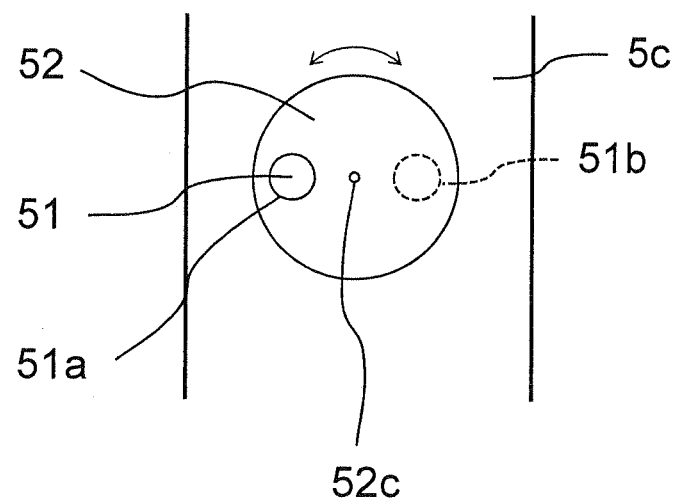
FIG. 5 is a front view of a support pin portion.

FIG. 4 is a top view showing a supporting structure for the front door body part 61 on the left side. As shown in FIG. 4, in the rear face of the front door body part 61, an engagement part 62 is formed for engaging with a support pin 51 formed in the intermediate longitudinal member 5c of the ROPS 5. FIG. 5 is a front view of the support pin 51. As shown in FIG. 5, the support pin 51 is attached through a rotation part 52 to the intermediate longitudinal member 5c and hence the rotation part 52 can be rotated about a shaft 52c. When the rotation part 52 is rotated, the position of the support pin 51 can be changed between an inward position 51a in the vehicle width directions and an outward position 51b in the vehicle width directions. The distance between the inward position 51a and the outward position 51b is 10 to 30 mm or the like.

Figure 6:
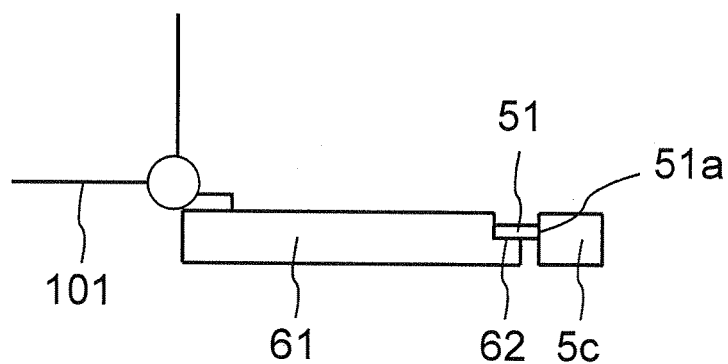
FIG. 6 is a top view showing a front door body part engaging with a support pin located at an inward position.
Figure 7:
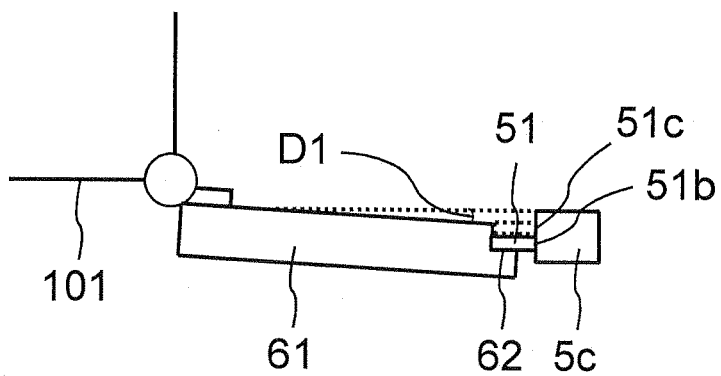
FIG. 7 is a top view showing a front door body part engaging with a support pin located at an outward position.

FIG. 6 is a top view showing the front door body part 61 engaging with the support pin 51 located at the inward position 51a. FIG. 7 is a top view showing the front door body part 61 engaging with the support pin 51 located at the outward position 51b. As shown in FIGS. 6 and 7, the front door body part 61 engaging with the support pin 51 located at the inward position 51a and the front door body part 61 engaging with the support pin 51 located at the outward position 51b deviate from each other by a distance D1 (10 to 30 mm) in the vehicle width directions. Here, in the front door body part 61, when it is premised that a gap is not formed between the front door body part 61 and the vehicle body frame at the time of engaging with the support pin 51 located at the inward position 51a, a gap of 10 to 30 mm is to be formed between the front door body part 61 and the vehicle body frame at the time of engaging with the support pin 51 located at the outward position 51b.

According to the front door 6 and the rear door 7 of the above-mentioned configuration, the following effects can be obtained.

(1) The door body part 61 or 71 can be set at a plurality of closed states each having a different gap relative to the vehicle body frame. This permits adjustment of the temperature environment in the inside of the vehicle, especially, in the lower part of the inside of the vehicle.

(2) When the position of the support pin 51 for engaging with the engagement part 62 of the door body part 61 or 71 is changed in the vehicle width directions, the presence or absence of a gap between the door body part 61 or 71 and the vehicle body frame can be selected. Thus, the situation can be changed to a state in which a gap is provided between the door body part 61 or 71 and the vehicle body frame so that ventilation is performed or a state in which the gap between the door body part 61 or 71 and the vehicle body frame is closed and hence ventilation is not performed. By virtue of this, the temperature environment in the inside of the vehicle can be adjusted.

The embodiment given above has been described for an example in which the rotation part 52 is rotated so that the position of the support pin 51 for engaging with the engagement part 62 of the front door body part 61 is changed to the inward position 51a or the outward position 51b. However, it is sufficient that the door can be set at a plurality of states each having a different gap between the front door body part 61 and the vehicle body frame. That is, in a case where the engagement part 62 of the front door body part 61 and the support pin 51 of the ROPS 5 are in engagement with each other, in place of a configuration where the position of the support pin 51 is changed to the inward position 51*a* or the outward position 51*b*, a support pin may be provided in each of the inward position 51*a* and the outward position 51*b* and then the engagement part may engage with any one of the support pins. For example, a configuration may be employed where the support pins can freely be ejected or retracted relative to the ROPS 5 and that, when the support pin located at the inward position 51*a* is protruding from the ROPS 5, the support pin located at the outward position 51*b* is retracted into the ROPS 5 and, in contrast, when the support pin located at the outward position 51*b* is protruding from the ROPS 5, the support pin located at the inward position 51*a* is retracted into the ROPS 5.

The embodiment shown in FIGS. 1-7 has been described for an example in which the position of the support pin 51 is changed to the inward position 51*a* or the outward position 51*b*. Instead, a configuration may be employed where the engagement part 62 of the front door body part 61 is displaced to an inward position or an outward position in the vehicle width directions so that the door can be set at a plurality of states each having a different gap between the front door body part and the vehicle body frame. Further, the engagement part 62 may be formed at both of the inward position and the outward position.

(Other Modifications)

Figure 8:
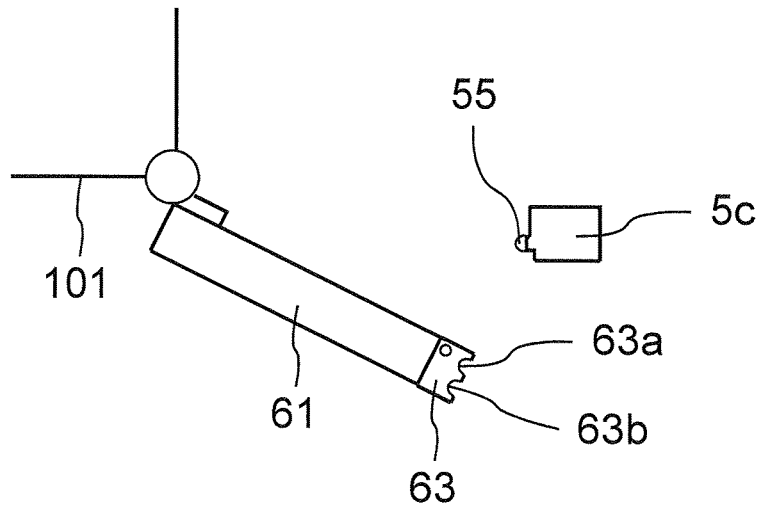
FIG. 8 is a schematic diagram showing another modification in which a door can be set at a plurality of states each having a different gap between the front door body part and the vehicle body frame.

FIG. 8 is a schematic diagram showing another modification in which a door can be set at a plurality of states each having a different gap between the front door body part 61 and the vehicle body frame. As shown in FIG. 8, a latch part 63 is formed in the rear face of the front door body part 61 and an engagement part 55 for engagement with the latch part 63 is formed in the intermediate longitudinal member 5*c* of the ROPS 5. The latch part 63 engages with the engagement part 55 at two steps. Then, each of engagement at a first step and engagement at a second step realizes a different gap between the front door body part and the vehicle body frame. The latch part 63 includes: a first latch part 63*a* for realizing engagement at the first step with the engagement part 55; and a second latch part 63*b* for realizing engagement at the second step with the engagement part 55. Then, the first latch part 63*a* is provided on the inner side relative to the second latch part 63*b* in the vehicle width directions.

Figure 9:
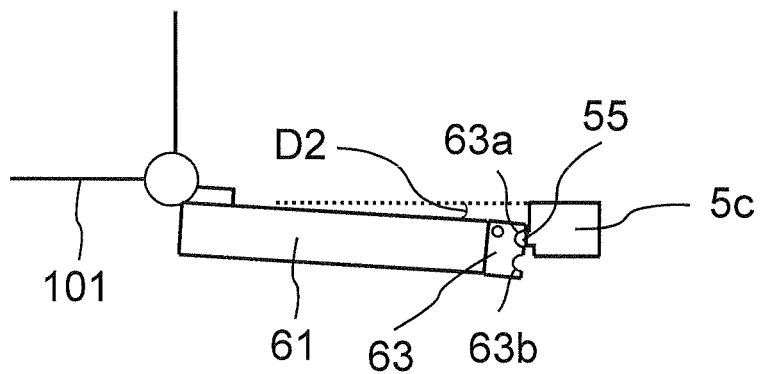
FIG. 9 is a top view showing a front door body part in which a first latch part and an engagement part engage with each other.
Figure 10:
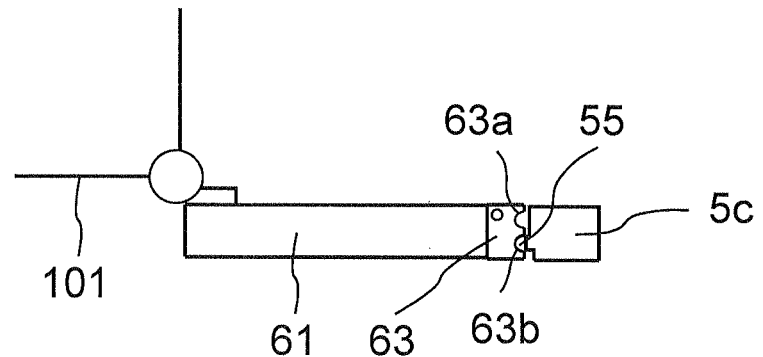
FIG. 10 is a top view showing a front door body part in which a second latch part and an engagement part engage with each other.

FIG. 9 is a top view showing the front door body part 61 in which the first latch part 63*a* and the engagement part 55 engage with each other. FIG. 10 is a top view showing the front door body part 61 in which the second latch part 63*b* and the engagement part 55 engage with each other. As shown in FIGS. 9 and 10, when the front door body part 61 is to be closed, first, the first latch part 63*a* engages with the engagement part 55. Then, the front door body part 61 is further drawn into the inner side in the vehicle width direction so that engagement between the first latch part 63*a* and the engagement part 55 is released and then the second latch part 63*b* goes into engagement with the engagement part 55. Thus, the front door body part 61 in a state in which the first latch part 63*a* and the engagement part 55 engage with each other with the front door body part 61 in a state in which the second latch part 63*b* and the engagement part 55 engage with each other deviate from each other by a distance D2 in the vehicle width direction. The distance D2 corresponds substantially to the distance between the first latch part 63*a* and the second latch part 63*b*. Thus, when the distance between the first latch part 63*a* and the second latch part 63*b* is 10 to 30 mm, the distance D2 becomes 10 to 30 mm. Here, when it is premised that a gap is not formed between the front door body part 61 and the vehicle body frame when the second latch part 63*b* engages with the engagement part 55, a gap of 10 to 30 mm is to be formed between the front door body part 61 and the vehicle body frame when the first latch part 63*a* engages with the engagement part 55.

According to the front door 6 and the rear door 7 of the above-mentioned configuration, the following effects can be obtained.

The latch part 63 of the door body part 61 or 71 and the engagement part 55 of the ROPS 5 realize the presence or absence of a gap between the door body part 61 or 71 and the vehicle body frame. Thus, the situation can be changed to a state in which a gap is provided between the door body part 61 or 71 and the vehicle body frame so that ventilation is performed or a state in which the gap between the door body part 61 or 71 and the vehicle body frame is closed and hence ventilation is not performed. By virtue of this, the temperature environment in the inside of the vehicle can be adjusted.

The embodiment shown in FIGS. 8-10 has been described for an example in which the door can be set at two states each having a different gap between the front door body part and the vehicle body frame. Alternatively, a configuration may be employed where the door can be set at three or more states each having a different gap. Specifically, it is sufficient that three or more engagement sites for the support pin, the engagement part, or the latch part are provided in the vehicle width direction.

Various modifications and changes may be made without departing from the spirit and the scope of the present invention described in the claims.

The invention claimed is:

1. A door for utility vehicle, wherein:
the door includes a door body part provided with a grip part used for opening and closing the door;
the door body part is supported by a vehicle body frame in a manner of being capable of being set at a plurality of closed states each having a different gap between the door body part and the vehicle body frame;
the door body part is provided with a latch part formed to be concaved forward from a rear face of the door body part;
the vehicle body frame is provided with an engagement part projecting forward from the vehicle body frame for engaging with the latch part;
the latch part includes a first latch part for realizing engagement with the engagement part at a first step of a partially closed state having a gap between the door body part and the vehicle body part, and a second latch part for realizing engagement with the engagement part at a second step of a completely closed state having no gap between the door body part and the vehicle body frame; and
the first latch part is provided on an inner side relative to the second latch part in the vehicle width direction.

2. A utility vehicle including the door according to claim 1.

* * * * *